United States Patent [19]
Banting

[11] Patent Number: 5,956,223
[45] Date of Patent: *Sep. 21, 1999

[54] SURGE PROTECTION SYSTEM INCLUDING PROPER OPERATION INDICATOR

[75] Inventor: John F. Banting, Waukesha, Wis.

[73] Assignee: Cooper Industries, Inc., Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/784,033

[22] Filed: Jan. 15, 1997

[51] Int. Cl.⁶ .................................................. H02H 1/00
[52] U.S. Cl. ........................................... 361/117; 361/111
[58] Field of Search ................................. 361/18, 54, 56, 361/57, 58, 88, 91, 93, 104, 111, 117, 118, 126, 127

[56] References Cited

U.S. PATENT DOCUMENTS

| | | | |
|---|---|---|---|
| 2,606,232 | 8/1952 | St. John | 175/223 |
| 3,725,745 | 4/1973 | Zisa | 317/104 |
| 3,914,657 | 10/1975 | Melanson | 317/61.5 |
| 4,004,193 | 1/1977 | Reckard | 317/70 |
| 4,158,872 | 6/1979 | Stephanides | 361/128 |
| 4,218,721 | 8/1980 | Stetson | 361/117 |
| 4,866,560 | 9/1989 | Allina | 361/104 |
| 4,901,187 | 2/1990 | Allina | 361/117 |
| 4,907,119 | 3/1990 | Allina | 361/56 |
| 4,908,730 | 3/1990 | Westrom | 361/56 |
| 4,930,039 | 5/1990 | Woodworth et al. | 361/127 |
| 4,931,895 | 6/1990 | Allina | 361/56 |
| 4,944,692 | 7/1990 | Allina | 439/517 |
| 5,006,950 | 4/1991 | Allina | 361/117 |
| 5,023,747 | 6/1991 | Lindsay | 361/117 |
| 5,129,841 | 7/1992 | Allina et al. | 439/517 |
| 5,130,884 | 7/1992 | Allina | 361/117 |
| 5,140,491 | 8/1992 | Allina | 361/56 |
| 5,148,345 | 9/1992 | Allina | 361/104 |
| 5,206,779 | 4/1993 | Sato et al. | 361/111 |
| 5,220,480 | 6/1993 | Kershaw, Jr. et al. | 361/117 |
| 5,364,290 | 11/1994 | Hartman | 361/659 |
| 5,412,526 | 5/1995 | Kapp et al. | 361/56 |
| 5,608,596 | 3/1997 | Smith et al. | 361/118 |

OTHER PUBLICATIONS

The Eastern Specialty Company Brochure, Bulletin No. 56, date Sep. 6, 1982.
The Eastern Specialty Company Brochure, Bulletin No. .502, dated Mar. 31, 1982.
"Low–Voltage–Side Current–Surge Phenomena in Single–Phase Distribution Transformer Systems" presented Sep. 14–19, 1986 at IEEE/PES 1986 Transmission and Distribution Conference, Anaheim, CA.
McGraw Edison Power Systems Group catalog Sheet #235–15, dated Feb. 1980.

*Primary Examiner*—Ronald W. Leja
*Attorney, Agent, or Firm*—Fish & Richardson P.C.

[57] ABSTRACT

A meter extender surge suppression system that fits between a utility meter and a meter box is provided to protect downstream equipment from surges on the electric power lines. The system includes an operation indicator light that reliably informs the operator whether the surge arresters are fully operational in all ambient light conditions. The invention includes a two-piece housing. All circuit components are mounted on portion of the housing to simplify manufacture and testing.

35 Claims, 5 Drawing Sheets

SURGE PROTECTION SYSTEM INCLUDING PROPER OPERATION INDICATOR

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates generally to surge suppression systems. More specifically, the present invention relates to surge suppression systems provided at the electrical service entrance. Even more specifically, the present invention relates to a simple, highly effective and reliable meter extender surge suppression system.

Modern life is defined by our dependence on electrical appliances and equipment. The microwave, the television, the VCR and the computer are just some of the standard goods in a contemporary home that rely on electricity for power. Likewise, computers, medical equipment, and communications equipment can be found in a variety of business environments. With such a substantial investment of resources, these products merit protection.

One potential hazard to these devices is electric surges delivered to the home or business over the electric utility lines or ground conductors. Over-voltage surges may be caused, for example, by lightning strikes or power frequency over-voltages. In an attempt to minimize or eliminate damage that would otherwise result from these surges, surge suppression apparatus and systems were introduced. A surge arrester is commonly connected in parallel with a comparatively expensive piece of electrical equipment to shunt over-voltage surges to ground, thereby protecting the equipment and circuits from damage or destruction. Placing surge arresters at the electrical entrance to the house or business is one way to protect against over-voltage surges. A convenient means to house and electrically connect such arresters is in a meter extender or meter adapter. A meter adapter is a device that is typically installed between a conventional electric watt-hour meter and the meter socket of a customer's meter box. The watt-hour meter records the power consumed by the customer's loads that are connected downstream of the meter. The meter box itself is typically installed immediately adjacent to and upstream of the customer's distribution panel, breaker box, or fuse box. The meter adapter plugs into the meter box and acts as a socket to receive the meter. Prior art meter extenders typically have included a housing and a number of voltage-dependent, non-linear resistive elements retained on or within the housing, as well as a pair of electrical terminals for connecting the surge arrester between line and ground. The voltage-dependent, non-linear resistive elements employed are typically, but not restricted to, metal oxide varistor (MOV) elements.

A varistor is a voltage-sensitive resistor. The volt-ampere characteristic is highly non-linear. That is, as the voltage increases across the MOV element, the dynamic resistance decreases and the current flow through the MOV increases rapidly. This phenomenon is due to the material's electronic response at an atomic level and not due to thermal effects (in contrast to thermisters). Nonetheless, heating of the varistor tends to magnify this effect. Due to the grain structure of the varistor at the atomic level, a high break-down voltage tends to reflect a high steady state resistance whereas a low break-down voltage tends to reflect a low steady state resistance.

The varistor elements provide either a high or a low impedance current path between the terminals of the voltage arrester or suppresser, depending on the voltage appearing across the varistor elements themselves. More specifically, within the power system steady state or normal operating voltages, the varistor elements have a relatively high impedance. As the applied voltage increases, gradually or abruptly, their impedance progressively declines until the voltage appearing across the varistors reaches what is known as the element's break-down voltage. At the break-down voltage, impedance dramatically decreases and the varistor elements become highly conductive. In this highly conductive mode, the varistor elements serve to conduct the transient over-voltage induced current to ground. As the transient over-voltage and resulting current dissipate, the varistor elements' impedance once again increases, restoring the arrester and electrical system to its normal, steady-state condition.

Occasionally, the transient condition may cause some degree of damage to one or more of the varistor elements. Such damage may lead to a condition known as "thermal runaway." When the varistor conducts transient currents to ground, heat is generated. Heating of the varistor results in lowering the resistance of the varistor and allows higher currents to flow. These higher currents tend to heat the varistors further, which, in turn, lowers the impedance of the varistor still further and allows still higher currents to flow. Excessive heating of the varistors lowers their resistance to such an extent that they become unable to cut off the flow of transient over-voltage current to ground. Ultimately, the varistors are destroyed and their resistance stays low, even after the over-voltage condition has disappeared.

Another manner in which varistors can be damaged is by arcing caused by flashover. Broadly, flashover is the term that describes when undesired electric arcing occurs between high and low potential points. Flashover may occur during over-voltage conditions. When two or more varistors exist in a surge suppression system, and one has a terminal at a significantly higher voltage than some point on the other varistor, arcing between the high and low potential locations can occur.

Varisters in prior art systems were sometimes placed in parallel to improve performance. So connected, however, the varistors may be susceptible to "cascaded failure." If the two (or more) varistor elements are not perfectly or nearly perfectly matched, one of the varistor elements tends to carry more current during over-voltage conditions than the other. This imbalance between or among varistors results in greater heating of one of the varistor elements, resulting in that varistor conducting a greater amount of current. This thereby leads to the varistor's ultimate destruction and failure due to thermal runaway. Sometimes, a varistor may fail violently, exploding into shrapnel-like fragments. In such an event, the remaining varistor (if not damaged by the failure of the first varistor) is left to handle another over-voltage condition. Often, this is more than the remaining varistor(s) can handle, and another varistor fails.

Certain of these problems are recognized in the prior art, and various inventors have tried to solve them. For example, Allina U.S. Pat. No. 4,931,895 ('895) discloses a meter base extender disposed between a conventional watt-hour meter and the meter socket of an electric utility box or panel. To reduce the chances of thermal run-away, Allina provides a heat sink connected to the grounded side of the varistors to dissipate thermal energy. However, this solution requires the extra cost of a heat sink, and the unit is not fully operational until the meter extender is assembled.

Despite surge suppressers' uncontested value, consumers are reluctant to spend a significant amount of capital for surge arrester or suppression systems since they may never be required. This reluctance often means that available products do not inherently include surge protection. A case in point is found in electronics. Due to the competitive nature of the electronics industry, transient protection circuitry is often overlooked to keep costs down. Nonetheless, multiple levels of protection, such as at the distribution transformer, service entrance, and at the electronic device itself provide the best protection. To complicate matters, the surge protection industry itself is very competitive, so keeping costs down, reliability up, and customer satisfaction as high as possible are particularly important to those in the industry. Surge protectors that achieve these goals are most likely to succeed in the marketplace.

Prior art devices often had significant shortcomings in one or more of these areas. As stated above, the surge arrester disclosed in Allina '895 requires that it be fully assembled in order to operate (Col. 4, lines 27–48). Such an approach necessarily creates alignment and assembly difficulties since it depends on closure of mating parts to make the requisite electrical contacts. Further, testing of the device can only occur after assembly. Still further, it is difficult to determine whether an inoperable Allina device is flawed in manufacture, was broken during assembly or shipping, or broken during installation, so the ultimate flaw causing the breakage may be difficult to pinpoint and solve.

Lindsay U.S. Pat. No. 5,023,747 teaches another meter-based surge suppression system. Once again, the invention must be fully assembled before being operational and therefore has similar limitations to Allina '895. Also, Lindsay depends upon assembly to electrically connect intricate elements of his device, thereby increasing the difficulty of his assembly. Such an approach decreases reliability first because the chances of breakage during assembly are higher than necessary, and second because any improperly connected elements may lead to failure of the device. Further, Lindsay depends on a circuit to emit a sound when his fuses have blown. However, surge suppression systems exist because electrical surges on the line may destroy electronic components. Lindsay's reliance upon electronic components to notify an observer that a fuse has blown could be misplaced if any of the electronic components are destroyed by the surges on the line.

Certain other protection schemes of this general type have contained a neon indicator or LED to inform the user that the system is operational or non-operational. In some such previous designs, one varistor in the system could be destroyed and the indicator light would continue to illuminate, albeit at a lower intensity. However, distinguishing between a dim light and a fully illuminated light can be difficult for the consumer, especially considering that not all lights have equal full intensities and the consumer views the light in various degrees of sunshine and darkness.

Therefore, a need exists for a low-cost, high-reliability surge arrester device. Ideally, this device could be tested before assembly with a minimum of time and resources. Further, the device would be easy to assemble and would resist breakage during assembly and installation. The ideal device could be easily assembled and would include a minimal number of components. Its longevity and reliability should also be higher than that known in the prior art. Lastly, the ideal device would preferably provide a clear, reliable indication to an observer whether varistor elements are operational.

SUMMARY OF THE INVENTION

The present invention solves many of the shortcomings of the prior art. The invention comprises a low-cost, high-reliability meter extender surge suppression device that can be tested before assembly and that decreases the likelihood of breakage during assembly and installation. It is easily assembled and includes a minimal number of components. Its components are protected from the elements in a sealed chamber to increase longevity and reliability. In addition, the present invention provides a clear, reliable indication to an observer as to whether all the varistors connected between the power supply and ground are operational.

A preferred embodiment comprises a surge protection system including a housing with socket and cover plate portions, suppression circuitry including first and second varistors mounted on the housing, and an indicator light coupled to the suppression circuitry. During normal steady-state operation, with both varistors operational, the indicator light is fully lit. Due to the presence of fuses, the placement of the varistors, and a set of transient voltage surge suppressers, the light will not illuminate when either the first or the second varistor is inoperable. Specifically, the disclosed embodiment's two transient voltage surge suppressers are electrically in series with the indicator light so that when an insufficient amount of voltage appears across the transient voltage surge suppressers, such as when a varistor fails, the light is extinguished.

The circuitry and components of the preferred embodiment are completely disposed on one portion of the housing such that the circuitry is operational even when the other portion of the housing is not assembled to the first portion. This permits ease of testing, assembly, and manufacture. Assembly is simple, and costs are minimized by the utilization of the same components for different functions. In addition, the present invention is designed so as to lessen the change of breakage during assembly and installation. Due to their location in a protective chamber, varistors and other components are protected against damage during both initial assembly and when a meter is installed into the meter extender. This protective enclosure requires no extra components or cost and is facilitated by the advantageous location of the preferred embodiment's circuitry. Advantageously, the varistors and fuses associated with the preferred embodiment are protected from each other's catastrophic failure. As such, the present invention solves many of the shortcomings of the prior art without an increase in cost or complexity.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

Figure 1:
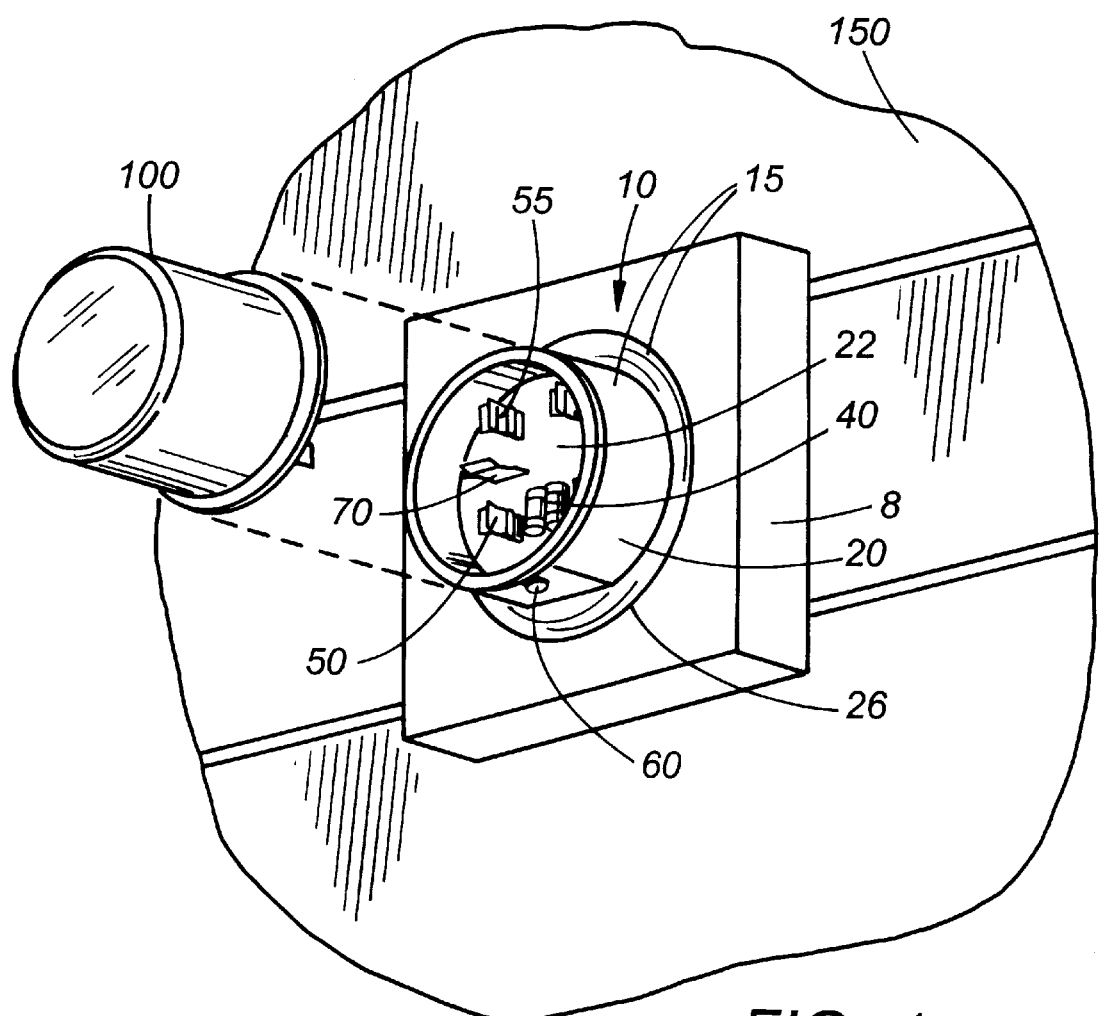
FIG. 1 is an exploded perspective view of the preferred embodiment of the meter extender surge suppression system as installed.

Referring to FIG. 1, the meter extender surge suppression system 10 of the present invention is shown installed in a panel box 8 at the service entrance of a home or business. A conventional meter 100 is positioned for easy coupling to meter extender surge suppression system 10. Meter extender surge suppression system 10 generally comprises a housing 15 including a first socket portion 20 and a second portion or cover plate 26.

Figure 2:
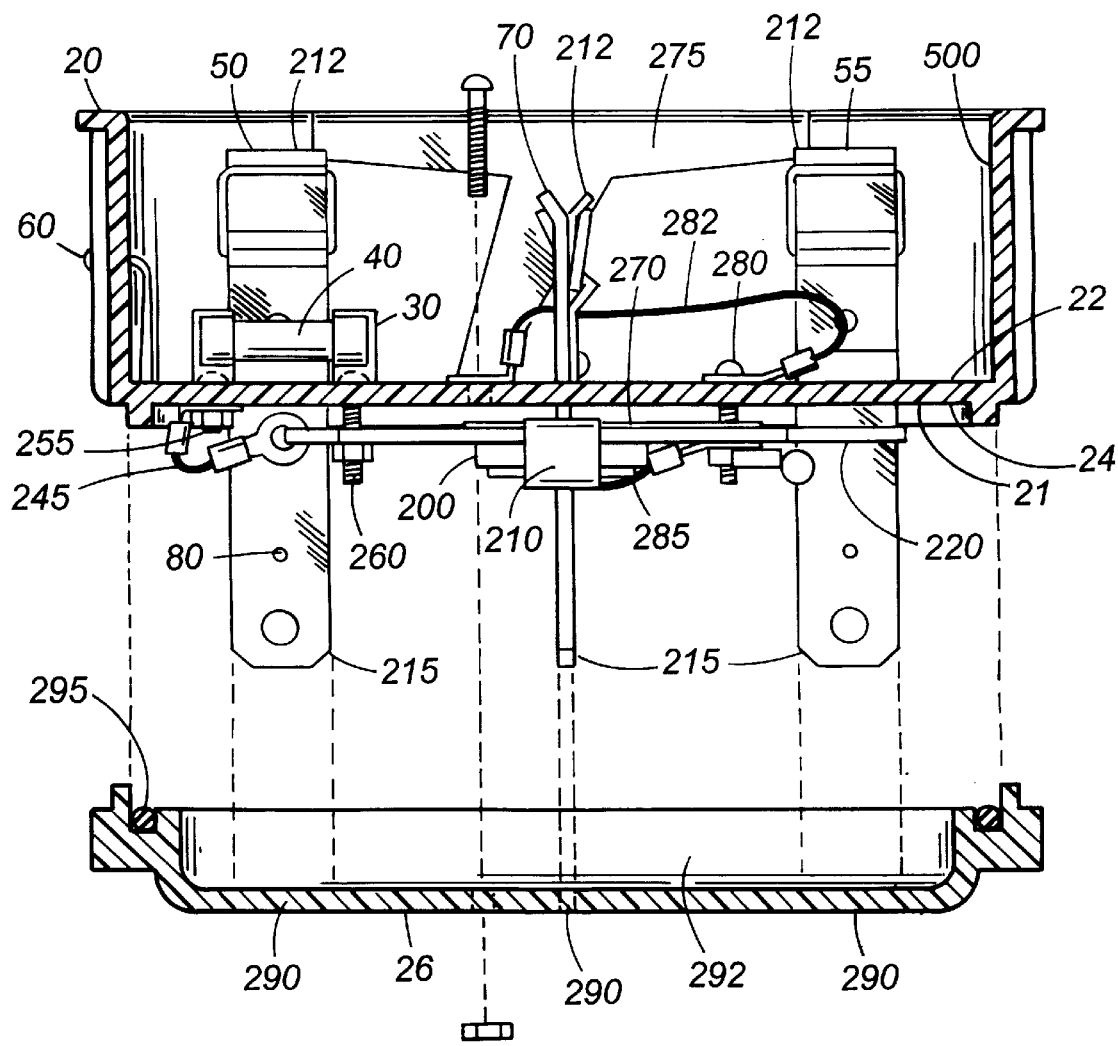
FIG. 2 is a side, partial cross-sectional view of the meter extender surge suppression system of FIG. 1.

As best shown in FIG. 2, socket portion 20 includes bottom 21 and integrally formed cylindrical side wall 500 extending therefrom. Bottom 21 includes inner surface 22 and outer surface 24. A pair of fuse holders 30 (shown more clearly in FIGS. 3 and 5) and fuses 40 are mounted on upper surface 22 by conducting fasteners 250, 255, 260. Conducting prongs 50, 55 and ground prong 70 include spring clip ends 212 and stab ends 215. Prongs 50, 55, 70 are disposed through slots formed in bottom 21 with spring clip ends 212 adjacent upper surface 22 of bottom 21. Indicator light 60 is mounted on the exterior of socket housing portion 20 on wall 500. Referring still to FIG. 2, housing cover plate 26 is also shown. While cover plate 26 is shown unconnected from socket portion 20, it is configured to couple snugly to socket portion 20 forming a chamber 292 therebetween. Cover plate 26 includes slits or holes 290 aligned and suitably configured to slidingly receive prongs 50, 55, and 70 therethrough. Upon assembly, cover plate 26 fits over prongs 50, 55, and 70 and secures into place on socket portion 20 using mounting clips (not shown, preferably "cotter" pins). Mounting clips are secured through mounting aperture 80 in prongs 50, 55. Also shown in FIG. 2 is an O-ring 295, used to hermetically seal cover plate 26 to socket portion 20 when assembly is complete. In this manner, chamber 292 is sealed from ambient dust, moisture and pollutants.

Figure 5:
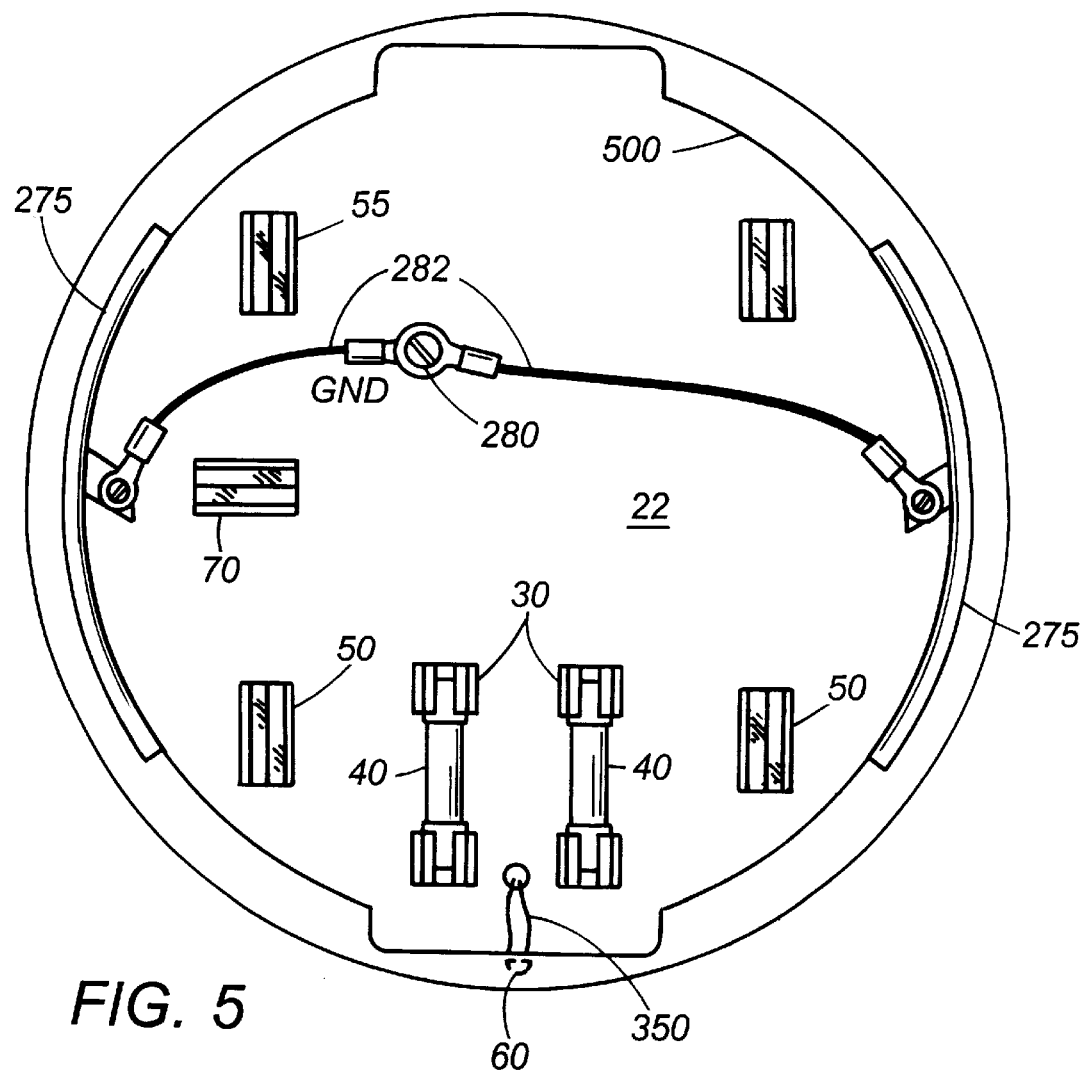
FIG. 5 is a top view of the meter extender.

Referring now to FIG. 5, socket portion 20 includes a pair of fuse holders 30, a pair of fuses 40, a pair of prongs 50, a pair of prongs 55, and a ground prong 70. Fuse holders 30 are preferably L-brackets but may also be of the clip-in variety. To assure reliability, fuses 40 are preferably soldered into fuse holders 30. Nonetheless, if clip-in fuse holders are selected over L-bracket fuse holders, fuses 40 may be retained merely by clipping them in place, thereby simplifying the removal and replacement of fuses 40 should that become necessary. Further, the fuses are advantageously located on surface 22, so that the housing 15 need not be disassembled to substitute a new fuse 40. When installed, the stabs or prongs from meter 100 matingly couple with spring clip ends 212 of prongs 50, 55 and ground prong 70. In this manner, electric power is delivered to the home or business via meter 100 and prongs 50, 70, prongs 55 not being energized in the embodiment presently described. Ground plates 275 (FIG. 2, 5) are connected to fastener 280 via leads 282. Ground plates 275 are mounted on wall 500 and mate with a grounded component on meter 100 so as to carry the ground through meter extender 10. In addition, leads 350 connect to indicator light 60, preferably an LED, whose operation is explained below.

Referring again to FIG. 2, attached to lower surface 24 of bottom 21 is circuit board 220 upon which surge protection and indication circuitry is mounted. In FIG. 2, the cross section is partial in that housing portions 26 and 20 are diagramatically cut as indicated by cross-hatching, but circuit board 220 is shown in its entirety. Attached on circuit board 220 by means of the compressive force of two conductive spring clips 210 are two disc-shaped metal oxide varistors (MOV) 200. Preferably, in this embodiment, MOV's have a discharge voltage of 1500–1700 volts at 5 Ka. Also connected to circuit board 220 and visible in FIG. 2 are fasteners 260 and 280. Although fasteners 260 and 280 are depicted in FIG. 2 as bolts, it would be obvious to an artisan of ordinary skill that other conductive fasteners may be appropriate. Conductive fasteners 260 and 280 mount and retain circuit board 220 to socket portion 20 and further serve as part of the current path for the current conducted through fuses 40. More specifically, fastener 260 electrically engages one end of fuse holder 30 and delivers current to circuit board 220. The other end of the fuse holders 30 is attached to bottom 21 by fastener 250 or 255. Best shown in FIG. 3, a jumper wire 240, 245 interconnects each fastener 250, 255 and a power prong 50 to deliver current through fuses 40 to circuit board 220. Jumper 285 interconnects fastener 280 and ground prong 70.

Figure 3:
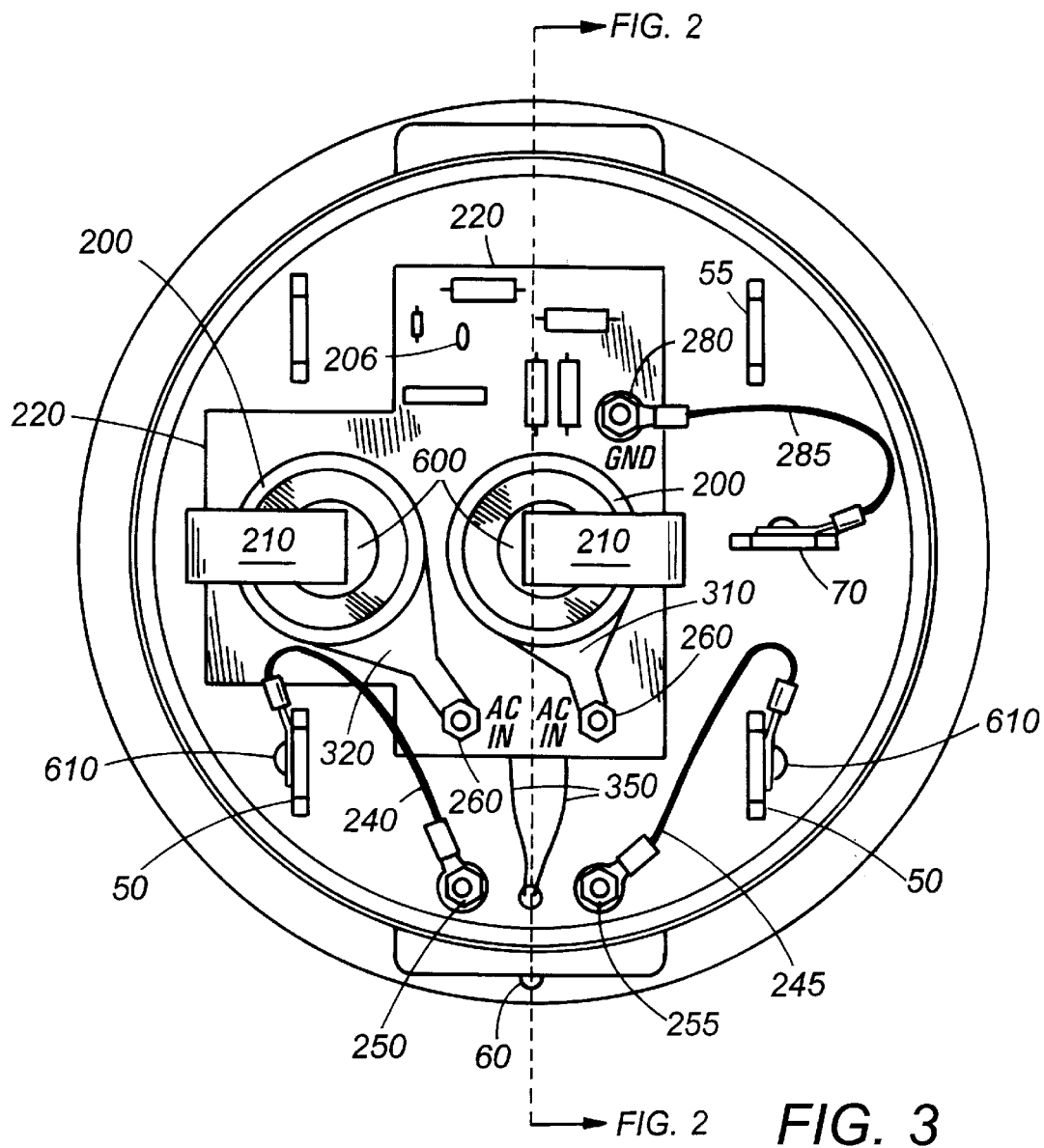
FIG. 3 is a bottom view of the meter extender of the present invention, showing line 2—2 representing the perspective of FIG. 2.

Circuit board 220 is best shown in FIG. 3. Board 220 includes conductive paths 310, 320. Conductive paths 310, 320 continue under and are contiguous with MOV's 200 so that the current path surface area to the MOV's 200 is maximized (not explicitly shown). A first face of each MOV 200 is retained in physical and electrical engagement with one of the conductive paths 310, 320 by conductive spring clips 210 as previously described. Spring clips 210 are preferably made of spring-tempered beryllium copper. Conductive disks 600, which may be copper or brass, for example, are positioned between spring clips 210 and MOV's 200 to increase the surface transfer area of the current path. Thus, conductive paths 310 and 320 provide the input of the alternating current from fuses 40 (FIG. 2) to the varistors 200. Lead or jumper 240 interconnects fastener 250 and one prong 50, while jumper 245 interconnects fastener 255 and an opposite prong 50. Leads 240 and 245 connect to prongs 50 by means of threaded fasteners 610 (FIG. 3). This "hard wire" approach to interconnecting MOV's to the incoming power source eliminates any concern about the prongs 50 not making good electrical contact with conductors or terminals employed to connect MOV's between line potential and ground. Such an approach improves the integrity and reliability of the electrical connections in the disclosed meter extender. An electrically insulative thin film or coating (not shown) is applied to the circuit board 220 as well as MOV's 200 and all its attached circuitry to minimize the chance of flash-over. This film is preferably sprayed on circuit board 220. It is electrically insulative, but as thermally conductive as practical so as to allow heat dissipation. A presently preferred film is a silicon resin with Dow Corning's 1-2577 silicon resin being presently preferred.

Referring to FIGS. 1–3 and 5, during installation meter extender 10 with protection circuitry is installed between meter 100 and service entrance box 8. The meter extender housing 15 is preferably comprised of structural grade plastic. Prongs 50 are connected between the power supply and the surge suppression circuitry located on circuit board 220 as previously described. This configuration results in the MOV's on circuit board 220 being electrically in parallel with the home or business to provide surge protection.

A first main current path exists through a prong 50 to a first fuse 40 via lead 245, fastener 255, and fuse holder 30. A second main current path also exists through opposite prong 50 to a second fuse 40 via lead 240 and fastener 250.

The main current paths continue through the fuses 40, and progress to the circuit board 220 via fasteners 260. As shown in more detail in FIG. 3, circuit board 220 interconnects varistors 200 to the power source by means of conductive paths 310, 320. Referring to FIGS. 2 and 3, current through MOV's 200 is conducted to ground via disks 600, spring clips 210, ground plate 270, fastener 280, lead 285, and to ground prong 70.

Figure 4:
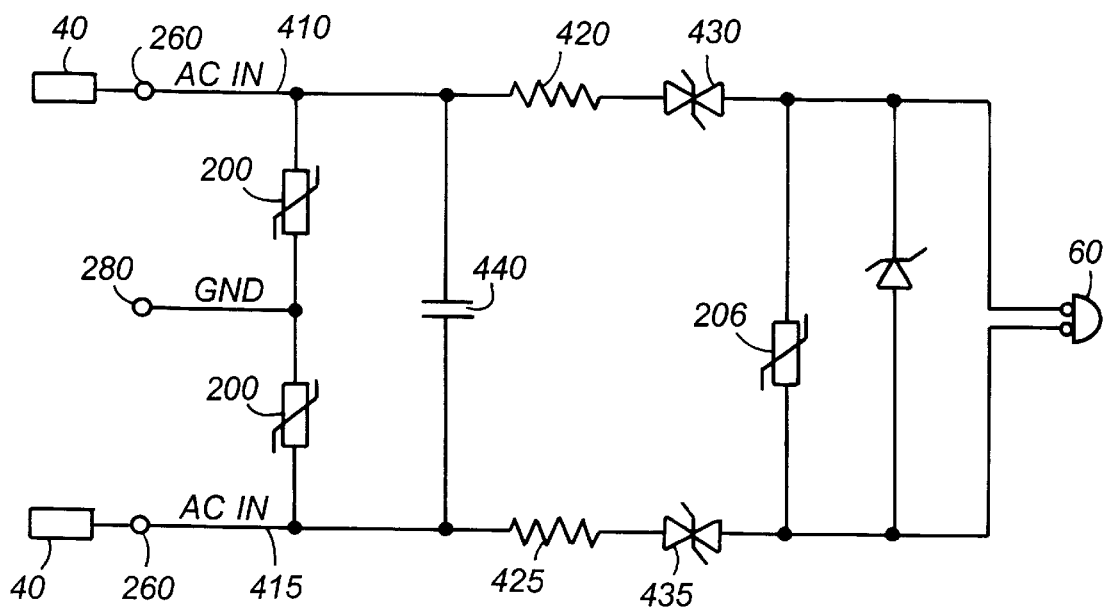
FIG. 4 is a schematic circuit diagram of the preferred embodiment.

Referring now to FIG. 4, the electrical response of the present invention will now be explained. The circuit of FIG. 4 depicts a two-pole power system and thus employs two MOV's 200, one each between line and ground. Nonetheless, it will be understood that more MOV's may be employed for differently-configured power systems. For example, for three phase service, three MOV's 200 would be employed.

In the embodiment of FIG. 4, a.c. power is supplied at pole one 410 and at pole two 415. The indicator light circuit shown includes current limiting resistors 420, 425 in addition to two transient voltage surge suppressers (TVSS) 430, 435 that are employed in an unconventional way to prevent unintentional operation of light 60. TVSS's allow current to flow only when there exists a designated minimum voltage across their terminals. Otherwise, no current flows through the TVSS. Capacitor 440 is provided for transient surges and MOV 206 is added for extra circuit protection. As can be seen, varistors 200 are not connected in parallel and so avoid the problem of cascaded failure. Rather, each varistor 200 is connected between a single pole of the input power and ground.

Normally, pole 410 and pole 415 each carry a 120 volt alternating current, for a total emf of 240 volts between pole 410 and pole 415. This is referred to as the steady-state condition. During the steady-state condition, MOV's 200 present a high resistance between line potential (120 V) and ground. Simultaneously, current flows through resisters 420, 425 (preferably 6.2 k$\Omega$) and TVSS's 430 and 435 to light LED 60 under steady-state conditions. TVSS's 430 and 435 are rated at about 90 volts each, although TVSS's of other rating may similarly be employed. Nonetheless, since they are in series, a minimum of 180 volts must appear between pole 410 and pole 415 for current to flow to indicator LED 60 and for LED 60 to be in its first illumination state (i.e. fully illuminated). This requirement is satisfied under the steady-state condition.

During over-voltage conditions, such as a lightning strike, the voltage across one or more MOVs 200 is significantly increased. If this increased voltage is beyond the MOV's predetermined discharge voltage, the resistance presented by the MOV significantly drops. That low resistance makes the MOV an attractive path for current and the transient-induced current is discharged to ground. Hence, surge protection is provided for the circuitry and equipment of the home or business.

However, such discharge heats the MOV(s). Heating of an MOV results in lowering the resistance of the varistor and allows higher currents to flow. Excessive heating of the varistor, as may occur if an MOV becomes damaged, may lead to thermal runaway and ultimate failure or destruction of the MOV. If the varistor becomes inoperable in this manner, the respective fuse 40 to the varistor 200 activates and thereby creates an open in the circuit. The term "inoperable" as used in this application refers to any condition where the MOV 200 fails to recover and provide its normal high resistance after a transient, and instead, maintains its low impedance, even after voltage transient is over.

When either fuse 40 activates, electricity is no longer provided to the corresponding pole 410, 415. This means that the emf across pole 410 and pole 415 is no longer more than the 180 volts required by the series TVSS's 430 and 435. Consequently, current no longer flows through light 60. Hence, light 60 is placed in its second illumination state (i.e. light 60 is extinguished).

A consumer may ensure that both MOVs are operational by checking, the condition of light 60. When fit, fight 60 indicates that the meter extender surge suppression system 10 is fully operational. The present invention ensures that light 60 will be unlit even if only one MOV 200 is inoperable and therefore only one fuse 40 has activated. This solves the recurring problem in the prior art where one varistor fails, but the indicator light continues to be illuminated.

Numerous advantages are attained by the preferred embodiment described herein. The disclosed configuration allows assembly to form a sealed chamber 292 between cover plate 26 and socket portion 20. This enclosure is hermetically sealed by O-ring 295. The compartment formed between the cover plate 26 and the socket portion 20 isolates the MOV's 200 and other electrical components from the ambient environment. This is important to prevent moisture and pollutants from contaminating the MOV's and other circuit components. Pollutants can cause tracking which can create a conductive path between an energized component and ground. Also, an unsealed environment may permit mold or fungus to grow due to the presence of moisture. By contrast, there is no seal provided between the electric meter 100 and the meter-receiving socket 20 of the meter adapter 10. If the MOV's were positioned on the upper surface 22 of the socket portion 20, they would be more exposed to the ambient environment and hence more exposed to pollution and moisture.

Additionally, by positioning the MOV's within chamber 292 formed between socket portion 20 and the cover plate 26, the MOV's 200 in the disclosed embodiment are protected from damage that may occur during shipping. Further, breakage is minimized during installation when a meter is plugged into the socket of the housing. At the manufacturing facility, cover plate 26 is placed over prongs 50, and attached to socket portion 20 by means of mounting clips (not shown). O-ring 295 is provided to seal the cover plate and socket portion. Therefore, upon assembly, circuit board 220, varistors 200, clips 210 and all the other leads and fasteners are protectively contained within an enclosure 292 formed by cover plate 26 and socket portion 20. Everything within this protective enclosure is located away from the person who installs the meter extender. Thus, when meter 100 is installed on meter extender 10 at home or a business site by linemen, delicate circuit components including MOV's 200 cannot suffer damage by being stabbed by the prongs of meter 100. Were the MOV's 200 not located in the disclosed chamber 292, the meter prongs may not be properly aligned when the meter is inserted into the meter adapter, which could damage the MOV's.

Another way the present invention increases meter-extender surge suppresser lifetime and reliability is by mounting fuses 40 and circuit board 220 on the opposite side bottom 21 of socket portion 20. Construction is simplified because the fuse side and the circuit side do not interfere with each other when the fuses and circuitry are being anchored to the socket portion of the housing. Ample room for fuses 40 is provided and, importantly, the components mounted on circuit board 220 cannot be damaged by catastrophic failure (e.g., explosion, breakage) of fuses 40. Likewise, fuses 40 cannot be injured by failure of varistors 200.

The preferred embodiment places all the electronic circuitry required for the meter extender surge suppression system on one housing portion, the socket portion 20. The cover plate does not support any electrical elements. This is not a trivial difference from the prior art. This configuration offers both component and labor cost savings. First, testing at the manufacturing facility is simplified. Since only one portion of the housing is required for testing, testing of the device can be performed before assembly. This allows detection and removal of all the faulty components before attaching the cover plate. Therefore, a manufacturer does not waste resources assembling a surge suppresser with faulty electronics. Component costs are also minimized, as cover plates, mounting pins, and prongs are conserved because cover plates are preferably attached only to socket housings that include properly functioning circuitry. Further, the invention may be constructed from off the shelf components, which minimizes costs still further.

In addition, by placing the circuit board 220 on the side of the socket portion 20 as shown in FIG. 2, breakage during assembly and during installation is minimized. This results in component and labor cost savings to the surge suppression provider and ultimately a lower price for the consumer. Further, no intricate but necessary electrical contacts depend on the engagement of the cover plate and the socket housing portion. Thus, it is not necessary to align and secure various components to mate the two portions of the housing together. The manufacturer must simply slip prongs 50, 55, and 70 through the corresponding holes 290 in cover plate 26. This both lowers assembly costs and minimizes breakage during assembly.

Additionally, component costs are minimized in part by the present invention's use of fasteners 250, 260, 280 both as anchors and as electrical conductors, thereby reducing the number of elements. These "hard wire" connections are extremely reliable. The cost and assembly complexities of a heat sink element is avoided by the high discharge voltage of the varistors used. More specifically, the discharge voltage of the preferred varistors of the present invention is approximately 1500–1700 volts at 5 Ka. By Ohm's law, the high steady state resistance of the varistor conducts a lower leakage current (the current that is "leaked" through the varistor to ground during steady-state operations) than exists in a varistor having a low discharge voltage. The low leakage current provided by the present invention eliminates the need for a heat sink.

Moreover, as explained above, the disclosed embodiment avoids many of the problems present in the prior art by using a configuration that minimizes flash-over and avoids cascaded failure. The disclosed embodiment also offers a reliable indicator light so that an operator may easily determine whether one of the varistors is inoperable. This indicator light is designed so that an operator may determine the status of the circuitry in the disclosed embodiment regardless of the amount of illumination provided.

Although the present invention has been described with reference to preferred embodiments, workers skilled in the art will recognize that changes may be made in the form and detail without departing from the spirit and scope of the invention. For example, while the term first illumination state has been referring in this application to a fully illuminated state and the term second illumination state has been referring to an extinguished state for the light 60, the first illumination state could refer to an extinguished state and the second illumination state could refer to a fully illuminated state for the light 60.

What is claimed is:

1. A surge suppression system for use with a separate meter comprising:

a housing including a first portion and a second portion, said second portion being removably detachable from said first portion; and circuitry including means for connecting to a power supply and including first and second varistors attached to said first portion of said housing, said circuitry remaining physically engaged so that it is completely structurally sufficient to provide surge suppression when said second portion is removably detached from said first portion.

2. The surge suppression system of claim 1, further comprising:

a light associated with said circuitry, said light having a first illumination state and a second illumination state, said light changing from said first illumination state to said second illumination state if at least one of said varistors becomes inoperable.

3. The surge suppression system of claim 1, wherein said circuitry includes a circuit board, and first and second compressive spring clip, said first and second varistors held to said circuit board by said first and second compressive spring clips, respectively.

4. The surge suppression system of claim 1, wherein said circuitry includes a circuit board, a first fuse, a second fuse, a first fastener coupled to said first fuse, and a second fastener coupled to said second fuse, wherein said first fastener is electrically coupled to said first fuse and said first varistor and said second fastener is electrically coupled to said second fuse and said second varistor, said circuit board being anchored to said housing by said first fastener.

5. The surge suppression system of claim 1, wherein said first and second varistors have respective first and second fuses associated with said circuitry, said first fuse activating when said first varistor is inoperable, and said second fuse activating when said second varistor is inoperable.

6. The surge suppression system of claim 1, further comprising:

a first pole supplying power to said circuitry;

a second pole supplying power to said circuitry;

ground connected to said circuitry;

wherein said first varistor is electrically connected between said first pole and ground and said second varistor is electrically connected between said second pole and ground.

7. The surge suppression system of claim 1, wherein said first portion matingly engages with said second portion to form an enclosure, said circuitry being located in said enclosure.

8. The surge suppression system of claim 1, wherein a complete current path is formed through said circuitry regardless of whether said first portion is attached to said second portion.

9. A surge suppression system comprising:

a housing including a first portion and a second portion;

circuitry including first and second varistors attached to said housing, wherein said circuitry further comprises a first transient voltage surge suppresser and a second transient voltage surge suppresser;

a light associated with said circuitry, said light having a first illumination state and a second illumination state, wherein said light changes from said first illumination state to said second illumination state if at least one of said varistors becomes inoperable, and wherein said light is in electrical series with said first transient voltage surge suppresser and with said second transient voltage surge suppresser;

wherein said first transient voltage surge suppresser and said second transient voltage surge suppresser are configured as level voltage series switches for said light so as to allow current to flow only when there exists a prescribed minimum voltage across the respective terminals of said transient voltage surge suppressers.

10. A meter extender comprising:

a housing including socket and cover plate portions, said cover plate portion being removably detachable from said socket portion; and circuitry including a first varistor and means for connecting the circuitry to a power source, said circuitry disposed on said socket portion of said housing such that said circuitry is capable of providing surge suppression when said cover plate portion is detached from said socket portion.

11. The meter extender of claim 10, further comprising:

a second varistor;

a light, said light not being illuminated if at least one of said varistors is inoperable.

12. The meter extender of claim 10, wherein said circuitry further comprises:

a second varistor;

a first fuse in electrical series with said first varistor;

a second fuse in electrical series with said second varistor; and a light.

13. The meter extender of claim 12, wherein said light is not illuminated when either said first fuse or said second fuse activates.

14. The meter extender of claim 12, wherein a complete current path is formed through said circuitry regardless of whether said cover plate portion is attached to said socket portion.

15. The meter extender of claim 14, wherein said circuitry is configured so that current does not flow through said light when either said first fuse or said second fuse activates.

16. The meter extender of claim 10, wherein said circuitry further comprises:

a light;

a first transient voltage surge suppresser; and a second transient voltage surge suppresser;

wherein said light is in electrical series with said first transient voltage surge suppresser and with said second transient surge suppresser.

17. The meter extender of claim 10, further comprising:

a first pole supplying power to said circuitry;

a second pole supplying power to said circuitry;

ground connected to said circuitry; and said circuitry further comprising a second varistor;

wherein said first varistor is electrically connected between said first pole and ground and said second varistor is electrically connected between said second pole and ground.

18. The meter extender of claim 17, further comprising:

a first fuse;

a second fuse;

a first fastener; and a second fastener, wherein said first fastener attaches said first fuse to said housing and carries current to said first varistor to form part of a current path from said first pole to ground and said second fastener attaches said second fuse to said housing and carries current to said second varistor to form part of a current path from said second pole to ground.

19. The meter extender of claim 10, wherein:

said circuitry further comprises:

a circuit board; and a spring clip, said spring clip holding said first varistor to said circuit board by compressive force.

20. The meter extender of claim 19, further comprising:

ground, wherein said spring clip carries current to said first varistor and forms part of a current path to allow current to flow through said first varistor to ground.

21. The meter extender of claim 10, wherein a complete current path is formed through said circuitry regardless of whether said cover plate portion is attached to said socket portion.

22. A meter extender comprising:

a housing having a socket portion and a base portion and an insulated chamber formed there between, said socket portion having a bottom with upper and lower surfaces;

aligned apertures in said bottom of said socket portion and said base portion;

a main prong and a ground prong affixed to said socket portion and disposed through said bottom of said socket portion and said base portion in said aligned apertures;

surge suppression circuitry supported from said lower surface of said socket portion in said chamber and electrically coupled between said main prong and said ground prong for conducting over voltage-induced surge currents to ground, wherein said surge suppression circuitry is capable of providing surge suppression when said socket portion and said base portion of said housing are disassembled;

a light mounted on said socket portion, said light having a first illumination state and a second illumination state;

illumination circuitry supported on said socket portion and coupled to said light, said illumination circuitry placing said light in said first illumination state when said surge suppression circuitry is operable.

23. The meter extender of claim 22 wherein said surge suppression circuitry is mounted on a circuit board supported from said bottom of said socket portion.

24. The meter extender of claim 23 wherein said surge suppression circuitry comprises at least one varistor and wherein said varistor is retained on said circuit board by a spring clip.

25. The meter extender of claim 24 wherein said spring clip is conducting and wherein said meter extender further comprises a conductive path from said varister to said ground prong, said spring clip forming a port;on of said conductive path.

26. The meter extender of claim 25 further comprising:

a fastener, said circuit board being attached to said housing by said fastener, wherein said surge suppression circuitry is mounted on said circuit board and said fastener conducts said over voltage-induced surge currents traveling to ground.

27. The meter extender of claim 23 wherein said surge suppression circuitry and said illumination circuitry are mounted on the same circuit board.

28. The meter extender of claim 27 further comprising:
a fastener, wherein said fastener both attaches said circuit board to said insulative housing and conducts said surge currents.

29. The meter extender of claim 27 wherein said surge suppression circuitry and said illumination circuitry are coated by an electrically insulating film.

30. The meter extender of claim 22, wherein said base portion includes an insulative o-ring for hermetically sealing said chamber.

31. The meter extender of claim 22, wherein a complete current path is formed through said circuitry regardless of whether said base portion is attached to said socket portion.

32. A surge suppressor comprising:
a surge suppression circuit including first and second varistors and means for connecting with a power source; and
a housing having two separable portions, which can be secured together to provide a protective compartment, wherein one of the two portions provides structure for supporting the entire surge suppression circuit, and a second of the two portions, arranged between the one portion and the power source, provides a cover for the protective compartment, and
wherein the one portion includes means for receiving an electric meter; and
wherein the surge suppressor is capable of operating in a test mode without the second portion of the housing.

33. The surge suppressor of claim 32 further comprising a light associated with the surge suppression circuit, wherein the light has a first illumination state and a second illumination state, said light changing from the first illumination state to the second illumination state if at least one of the varistors becomes inoperable.

34. The surge suppressor of claim 33, wherein said surge suppression circuit further comprises:
a first and a second transient voltage surge suppresser in series with the light, wherein the first and the second transient voltage surge suppressers are configured such that they serve as level voltage series switches for the light so as to allow current to flow only when there exists a prescribed minimum voltage across the respective terminals of said transient voltage surge suppressers.

35. The surge suppressor of claim 32, wherein a complete current path is formed through said circuit regardless of whether said two portions are connected.

* * * * *